Figure 1:
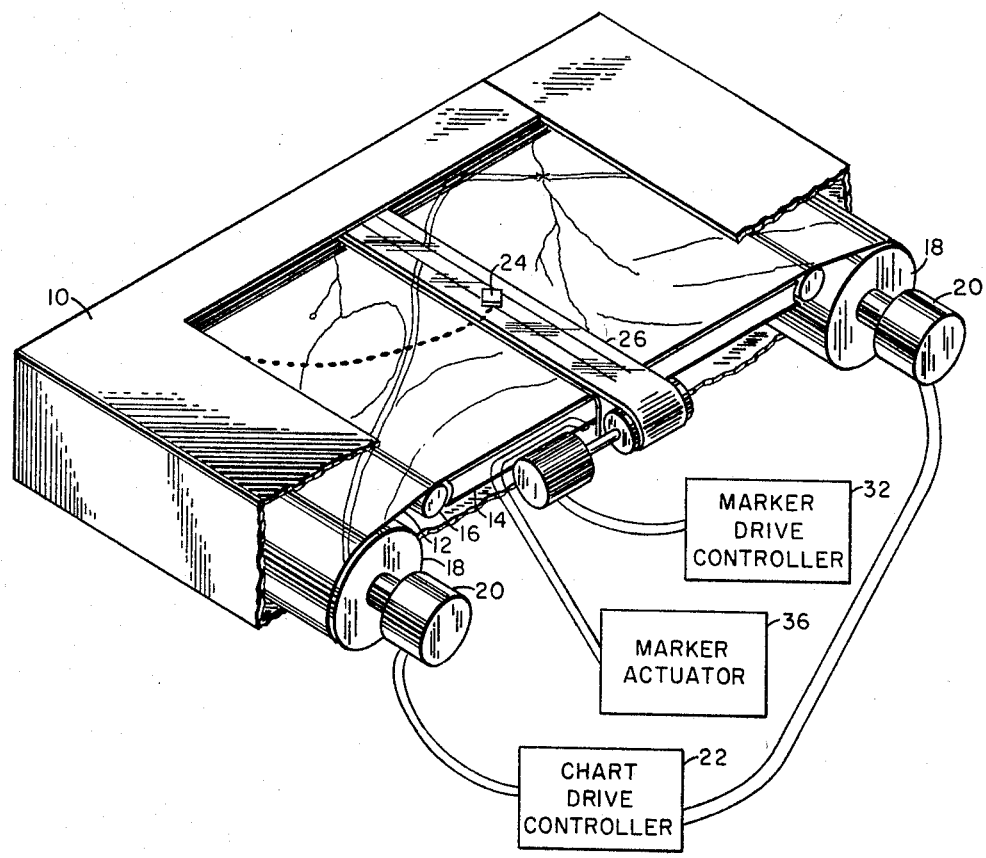

Oct. 25, 1966   J. B. MADEIRA ETAL   3,281,853
DISPLAY MARKING APPARATUS

Filed May 11, 1964                          2 Sheets-Sheet 1

INVENTOR.
JOHN BERNARD MADEIRA
ROBERT T. PEARSON
BY

*Philip J. McFarland*
ATTORNEY

United States Patent Office 3,281,853
Patented Oct. 25, 1966

3,281,853
DISPLAY MARKING APPARATUS
John Bernard Madeira, Arlington, and Robert T. Pearson, Beverly, Mass., assignors to Laboratory for Electronics, Inc., Boston, Mass., a corporation of Delaware
Filed May 11, 1964, Ser. No. 366,377
2 Claims. (Cl. 346—8)

This invention pertains generally to display apparatus and particularly to apparatus of such type which is especially well adapted to plotting the position of a moving vehicle, as an aircraft.

Many types of display apparatus are presently in use to provide a visual record of the position, or ground track, of an aircraft. Among such apparatus are those which, for convenience, may be designated as "electromechanical plotters." Generally, such a plotter comprises: means for holding a chart and a marking device, as a stylus; means for moving the chart and the stylus relative to one another so that the stylus, when actuated, moves into contact with the chart to make a mark thereon indicating the position of the aircraft; and, means for periodically actuating the stylus. Thus, a series of marks in the form of "dots" are made on the chart indicating the ground track of the aircraft. The last formed mark, of course, represents the present position of the aircraft.

It has been recognized that electromechanical plotters of the type just referred to are not ideally suited to use in aircraft, even though, perforce, such plotters have been rather widely accepted. First of all, the stylus and its appurtenant supporting and actuating means often causes important position indicating marks or topographical features on the chart to be obsecured, thus detracting from the value of the plotter. Further, the relative complexity of the supporting and actuating means required for a stylus makes the plotter susceptible to failure in the adverse environmental conditions encountered in airborne applications.

Therefore, it is a primary object of this invention to provide an improved electromechanical plotter wherein marks indicating the position of a moving vehicle are printed on a chart.

Another object of this invention is to provide an improved electromechanical plotter wherein a relatively small marking device is used so that a minimum amount of a chart is obscured.

Still another object of this invention is to provide an improved electromechanical plotter which meets the foregoing objects with a light, simple and rugged marking device.

Figure 2:
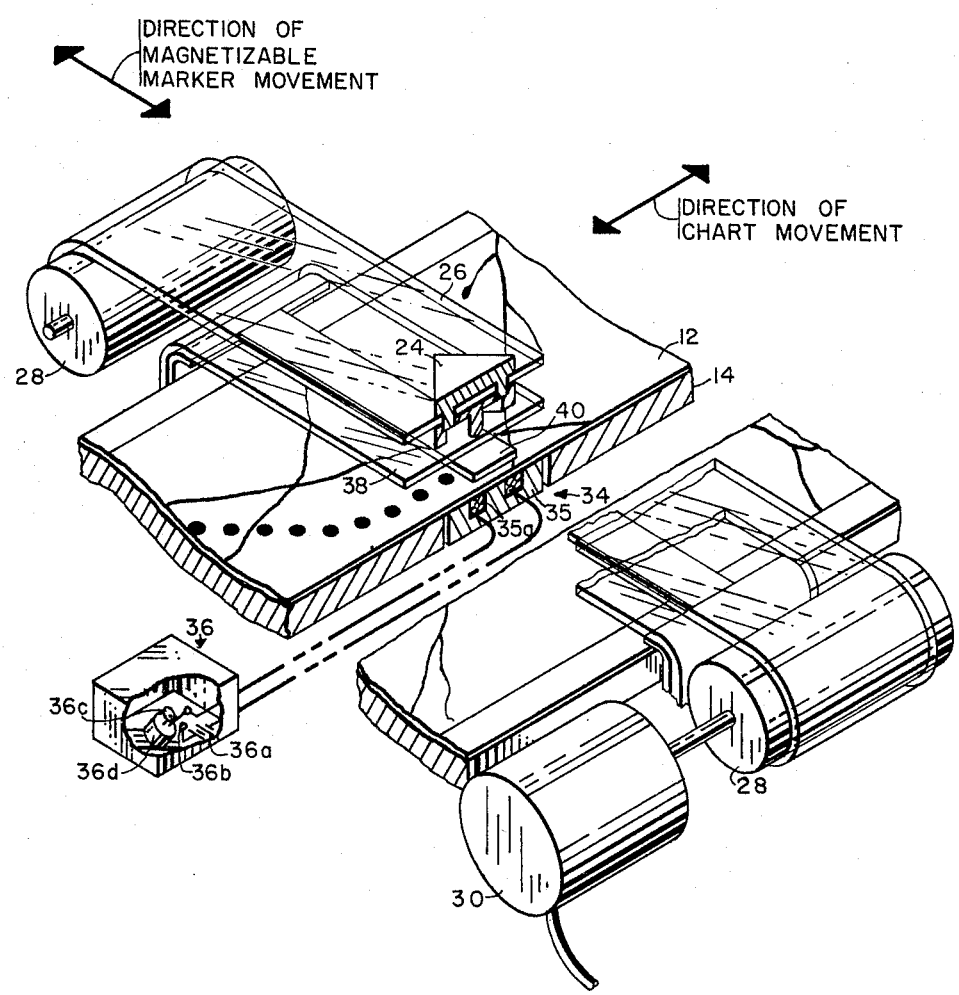

These and other objects of this invention are attained generally in an electromechanical plotter wherein an inked ribbon and a magnetizable marker affixed to a transparent tape are supported over a chart. When the magnetizable marker is magnetized it moves toward the chart, thereby causing a mark to be printed by transfer of ink from the inked ribbon to the chart. For a more complete understanding of this invention reference is now made to the following specification and to the attached drawings, in which:

FIG. 1 is a perspective view, partially cut away and somewhat simplified, of a plotter according to this invention; and, FIG. 2 is a partially schematic and partially perspective view, again cut away and somewhat simplified, showing particularly a way in which a magnetizable marker and associated elements according to this invention may be mounted in the plotter illustrated in FIG. 1.

Referring now to FIG. 1 it may be seen that an electromechanical plotter according to a preferred embodiment of this invention comprises a case 10 having an opening formed therein for displaying a portion of a chart 12 (which, of course, is not an element, per se, of our invention). The chart 12 is laid over a platen 14, a guide roller 16 and around spools 18. The spools 18 are driven in any convenient manner, as by motors 20 under the control of a chart drive controller 22. The last-named element is well known in the art and will not be here described in detail. For example, the chart drive controller shown in Roberts, U.S. Patent #3,113,313 may be used here.

A magnetizable marker 24, fabricated from a material as sintered ferrite, is affixed, in any convenient manner, to an endless belt 26 fabricated from a substantially transparent material, such as a plastic like that produced by the E. I. du Pont Co. and known as "MYLAR." The endless belt 26 is supported on rollers 28, one of which is driven by a motor 30 in response to signals from a marker drive controller 32. Again it should be noted that, since the last named element is as well known in the art as the chart drive controller 22, it will not be described in detail.

The platen 14 is slotted transversely beneath the endless belt 26 to accommodate an electromagnet 34 (shown in FIG. 2) having a pole piece 35 flush with the upper surface of the platen 14 and an energizing coil 35a. The energizing coil 35a in turn is connected to a marker actuator 36 which, as shown in FIG. 2, simply consists of a source 36a of electric current and a cam operated switch 36b in series with the energizing coil 35a. The cam operated switch 36b in turn is closed periodically by a cam 36c which is rotated by a motor 36d.

Interposed between the endless belt 26 and the magnetizable marker 24 carried thereon and the chart 12 is a strip 38, preferably of the same material as the endless belt 26, to which is affixed, in any convenient manner, an inked ribbon 40. The strip 38 and the inked ribbon 40 are held in position in any convenient manner, as by clamps (not shown) so that the inked ribbon 40 is just separated from the chart 12.

The just-described assembly operates in the following manner. The chart drive controller 22 and the marker drive controller 32, in response to signals from any navigational system (not shown) but which may be, for example, a Doppler radar system such as the AN/APN–131, produce control signals which ultimately cause the chart 12 and the magnetizable marker 24 to move relative to one another until the magnetizable marker 24 is over the position of the aircraft on the chart 12. The marker actuator 36 is then placed in operation, causing a pulse of electric current to flow through the energizing coil 35a of the electromagnet 34. Consequently, a magnetic field is set up attracting the magnetizable marker 24 toward the electromagnet 34. The movement of the magnetizable marker in turn causes the strip 38 and the inked ribbon 40 to be deformed so that a small portion (depending on the transverse position of the magnetizable marker 24) of the inked ribbon 40 is brought into contact with the chart 12. Repetitive action of the marker actuator 36 as the aircraft moves further results in a series of marks, as shown in the figures, representative of the ground track of the aircraft.

It will be immediately evident that the described embodiment of our invention fulfills all the objects recited hereinbefore. Thus, the magnetizable marker and the inked ribbon are the only elements which obscure, in any way, details on the chart. The former may, however, be made very small (as compared to any known stylus and supporting mechanism), while the latter may be made narrow enough to serve as a visual cross-axis reference line. Further, it is evident that the mass and complexity of the contemplated marking mechanism is such that it is very well adapted to use in the adverse environmental conditions encountered in aircraft.

It will also be immediately apparent that many modifications may be made to the illustrated embodiment of our invention without departing from our inventive concepts. Thus, it is obvious that the shape of the magnetizable marker and the arrangement of the electromagnet may be varied so long as the magnetizable marker is attracted toward the electromagnet with sufficient force to cause the desired printing, regardless of the transverse position of the marker. It will also be obvious that, instead of a single inked ribbon a number of parallel ribbons, each of a different color, could be used if it is desired to incorporate means for incrementally displacing the magnetizable marker with respect to such ribbons. It is felt, therefore, that this invention should not be restricted to its illustrated embodiment but rather should be limited only by the spirit and scope of the appended claims.

What is claimed is:
1. Apparatus for plotting the position of a moving vehicle comprising:
   (a) A platen over which a chart to be marked may be moveably disposed,
   (b) An electromagnet positioned within said platen and having at least one pole extending in a transverse direction with respect to said platen,
   (c) An inked ribbon supported by a first transparent member overlying the chart, both said inked ribbon and said support member extending in a transverse direction with respect to said platen and being aligned with said pole of said electromagnet,
   (d) A second transparent member overlying said inked ribbon and being moveable in a transverse direction with respect to said chart,
   (e) A magnetizable marker affixed to said second transparent member,
   (f) Means for moving the chart and the second transparent member with respect to one another, thereby positioning the magnetizable marker over the chart in accordance with the position of the moving vehicle, and,
   (g) Means for periodically energizing the electromagnet portion of the platen to cause the magnetizable marker to strike the inked ribbon, thereby making marks on the chart to indicate thereon the position of the moving vehicle.

2. Apparatus as in claim 1 wherein the means for moving the chart and the transparent tape with respect to one another include means for moving the transparent tape, in accordance with movement of the moving vehicle along a first coordinate, in a direction parallel to the at least one pole, and, means for moving the chart, in accordance with movement of the moving vehicle along a second coordinate, in a direction perpendicular to the at least one pole.

References Cited by the Examiner
UNITED STATES PATENTS

| | | | |
|---|---|---|---|
| 792,680 | 6/1905 | Taylor et al. | 346—33 |
| 3,145,070 | 8/1964 | Miller et al. | 346—29 |

FOREIGN PATENTS

| | | |
|---|---|---|
| 686,077 | 5/1964 | Canada. |
| 915,164 | 1/1963 | Great Britain. |

RICHARD B. WILKINSON, *Primary Examiner.*

LEO SMILOW, *Examiner.*

J. W. HARTARY, *Assistant Examiner.*